L. A. ASPINWALL.
FERTILIZER ATTACHMENT FOR PLANTING MACHINES.
APPLICATION FILED FEB. 28, 1917.

1,234,525.

Patented July 24, 1917.
2 SHEETS—SHEET 1.

Inventor
Lewis Augustus Aspinwall
by Serrell Son
his Attys.

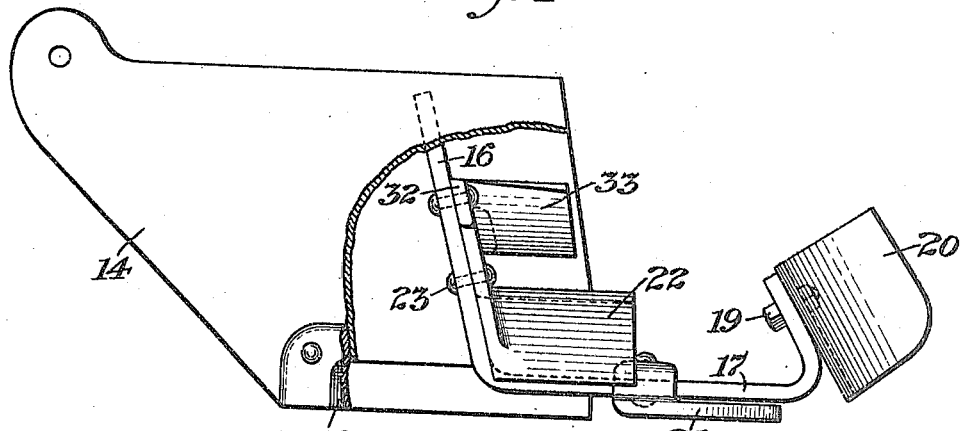
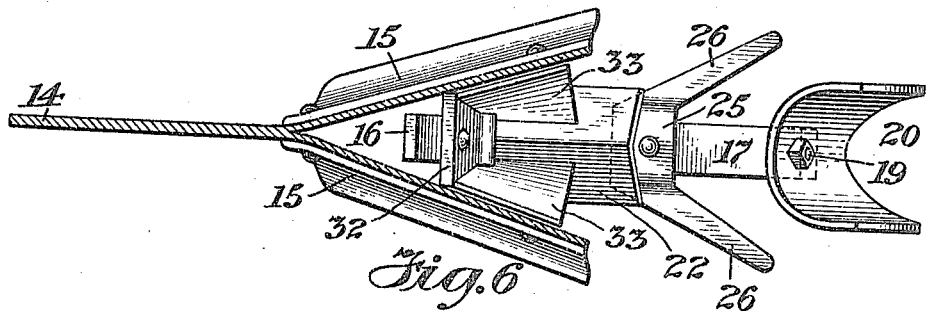
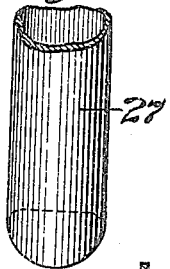
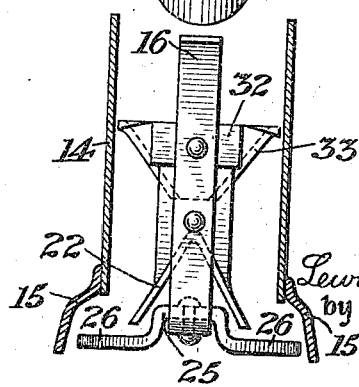

UNITED STATES PATENT OFFICE.

LEWIS AUGUSTUS ASPINWALL, OF JACKSON, MICHIGAN, ASSIGNOR TO ASPINWALL MANUFACTURING COMPANY, OF JACKSON, MICHIGAN, A CORPORATION OF MICHIGAN.

FERTILIZER ATTACHMENT FOR PLANTING-MACHINES.

1,234,525.  Specification of Letters Patent.  Patented July 24, 1917.

Application filed February 28, 1917. Serial No. 151,402.

*To all whom it may concern:*

Be it known that I, LEWIS AUGUSTUS ASPINWALL, a citizen of the United States, residing at Jackson, in the county of Jackson and State of Michigan, have invented an Improvement in Fertilizer Attachments for Planting-Machines, of which the following is the specification.

My present invention relates to a fertilizer attachment for planting machines, and while herein illustrated and described as applicable to a potato planter, it will be understood that it may be used to equal advantage in machines constructed for planting corn or any other seeds.

I am aware that heretofore divers forms of fertilizer attachments have been applied to a seed planting apparatus and in general the present invention relates to the form of fertilizer attachments shown and described in Letters Patent No. 529,099 granted to me November 13, 1894, and as applied in the potato planter shown and described in Letters Patent No. 658,562 granted Sept. 25, 1900.

The present fertilizer attachment, so far as the feeding devices are concerned, may be constructed in accordance with the apparatus shown in the former patent hereinbefore referred to or otherwise, as the feeding devices form no part of my present invention. In the fertilizer attachment shown in the latter named patent, I employ an inverted V-shaped spreader below a suitable chute extending from the fertilizer hopper. This spreader however, was used at an appreciable distance above the ground and consequently considerably above the bottom of the furrow opened by the plow of the planter, which furrow, as was then customary, was V-shaped, the plow being of the usual ordinary construction to open a furrow of this form. In the use of this and similar fertilizer attachments the fertilizer was not evenly distributed and in view of the shape of the furrow the fertilizer together with the soil would often fall to the bottom of the furrow at the place or approximately close to the place where the seed is to be deposited. The advantage of placing the seed adjacent but not in immediate contact with the fertilizer will be readily appreciated and in order to accomplish this and overcome the objection hereinbefore indicated, is the principal object of my present invention.

The invention also includes a shoe device placed between the plow and the mouth or orifice of the seed chute to prevent a possible injury to the latter by stones or other obstacles which might come into contact with the seed chute to injure or destroy the same, this shoe structure being similar to the corresponding member shown and described in Letters Patent No. 709,660 granted to me Sept. 23, 1902.

In carrying out the present invention and to accomplish the purposes hereinbefore specified together with the fertilizer hopper devices for feeding the fertilizer therefrom into a chute depending from the hopper, I employ a plow which is so constructed as to open a furrow having parallel or under cut walls, a seed chute and a shoe extending between the plow and the seed chute, a fertilizer deflector or spreader beneath the fertilizer chute leading from the hopper, and a mixer device preferably carried by the shoe and extending laterally therefrom so as to mix the fertilizer and the soil on both sides of the line into which the potatoes or other seeds are deposited by the planter in the furrow opened by the plow, as will be hereinafter more particularly described.

In the drawing:

Fig. 4 is a sectional elevation of the plow and associated parts in a position as shown in Fig. 1, illustrating another form of the invention.

Fig. 5 is a sectional plan similar to Fig. 2, and

Fig. 6 is a sectional elevation similar to Fig. 3, both Figs. 5 and 6 illustrating the form of invention shown in Fig. 4.

Figure 1:
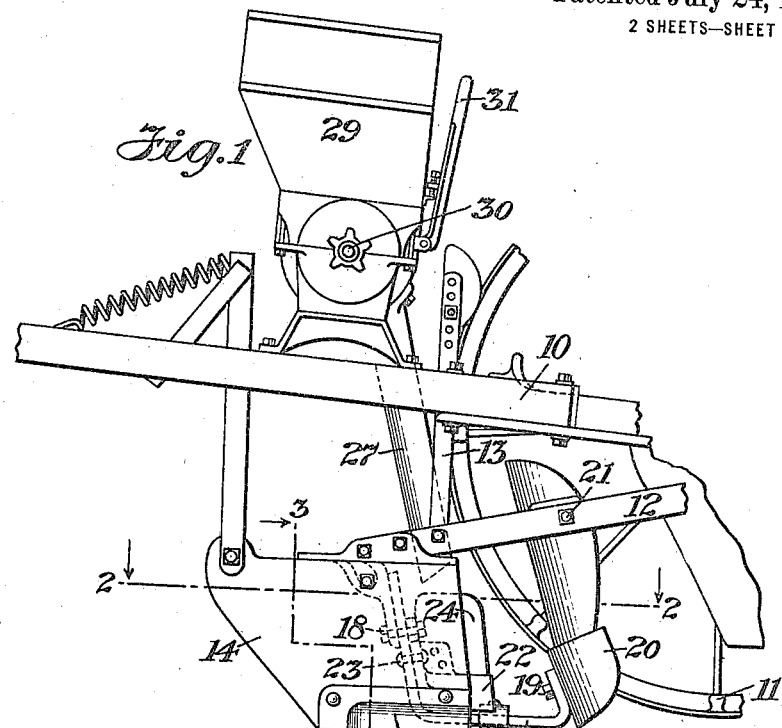
Figure 1 is an elevation illustrating the part of a potato planter in which my improved fertilizer distributer is incorporated.

Referring to the drawing 10 designates the frame of a potato planter, which as is customary in machines of this class, is suitably connected to an axle upon which the draft wheels 11 are mounted. Also pivotally connected to the axle or otherwise in the machine, is a plow bar 12 fitted with a lifter bar 13 and suitable devices by which the plow bar 12 and the plow 14 connected thereto may be raised and lowered in the apparatus. As indicated in the drawing, the members of this plow bar to the rear of the cutting edge thereof, are preferably walls which stand in a vertical position and diverge from one another, while adjacent the lower edges they are provided with spreader plates 15 connected thereto by rivets or otherwise so as to be removable and to open the form of furrow hereinafter described.

While I have herein described the form of plow that I prefer to employ, it will be understood that the walls of the plow may be made to diverge from the top to the desired spreader width at the bottom, and while I also prefer to make the spreader plates separately and attach them to the lower edges of the plow, these spreader plates and the walls of the plow may be made integral in any form the plow may assume.

Interiorly the plow 14 is provided with a division or wall 16 connected to which is a shoe 17. Bolts 18 or other means are employed for connecting one end of the shoe to the division plate, while bolts 19 are employed for connecting the opposite end of the shoe to the lower end of the seed chute 20. The upper end of the seed chute may be suitably connected in the plow bar 12 by means of a bolt 21 or otherwise, this construction with the exception of the form of the plow being similar to that shown and described in Letters Patent No. 709,660.

I also employ an inverted V-shaped spreader or deflector plate 22. This is riveted to the shoe 17 as indicated at 23 or otherwise connected thereto. The spreader plate 22 spans and extends appreciably beyond the sides of the shoe 17 and has connected thereto a dividing plate 24 of thin metal extending upwardly in a vertical direction toward a fertilizer chute from a container for the fertilizer.

I also employ a mixer plate 25. This is suitably attached to the shoe 17 by means of a bolt or rivet or otherwise, spanning the shoe and extending therefrom on opposite sides in the mixer arms indicated at 26.

The upper edge of the dividing plate 24 is immediately below the end of a fertilizer chute 27, when the parts are in position for use as indicated in Fig. 1, and the chute 27 is provided with a longitudinal slot 28 to receive this dividing plate when the plow and associated parts are raised. This of course as will be understood, is when the apparatus is not in use.

The fertilizer is placed in a hopper 29 at the bottom of which there are feeding devices 30 herein diagrammatically illustrated and which may be the same as, or similar to, the feeding devices shown and described in Letters Patent No. 529,099. These feeding devices are operated by any suitable means from the drive shaft of the planter and may be connected and disconnected by operating the lever 31. As will be furthermore understood, the fertilizer from the hopper 29 is conveyed from the feeding device 30 to the chute 27.

Figure 2:
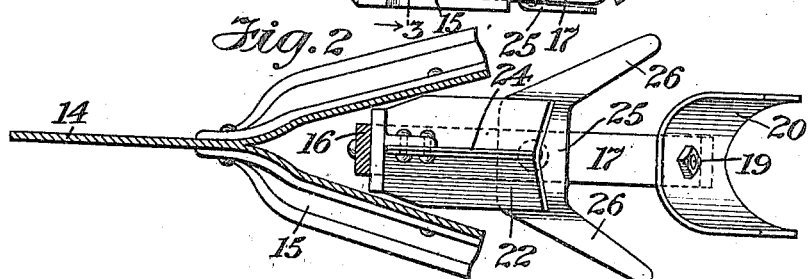
Fig. 2 is a cross section taken approximately on line 2, 2 Fig. 1.
Figure 3:
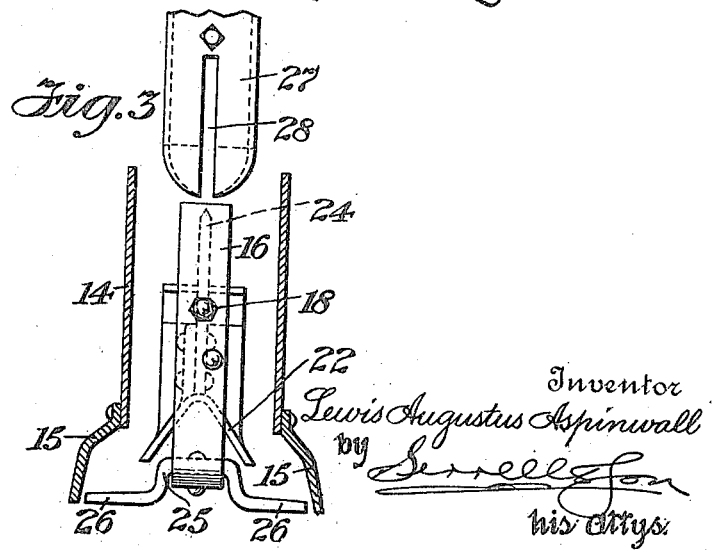
Fig. 3 is a sectional elevation illustrating the plow, the spreader, and the mixer, and taken approximately on line 3, 3 Fig. 1.

Instead of employing the dividing plate illustrated in Figs. 1, 2 and 3 for directing the fertilizer from the chute 27 to the deflector or spreader, I may employ an auxiliary chute illustrated in Figs. 4, 5 and 6. Referring to these figures it will be seen that this auxiliary chute 32 is bolted or otherwise secured to the shoe in a position immediately above the deflector and preferably comprises inclined walls 33 which converge toward the apex of the inverted V-shaped deflector so that the fertilizer as it is discharged from the chute 27, passes into this auxiliary chute and is directed thereby to the apex of the deflector, where as will be understood, it is divided in substantially equal parts one half passing over one side of the deflector, while the other half passes over the opposite side thereof. In this construction as will be apparent, it is not necessary to provide the end of the chute 27 with the slot 28, and any difficulty which might arise by injury to the dividing plate is obviated.

In the operation of the hereinbefore described apparatus the plow opens the furrow the sides of which are either substantially vertical or upright, and at the lower portions are slightly undercut by virtue of the spreader plates 15 attached to the lower edges of the plow. The fertilizer on being fed from the hopper through the feeding devices to the chute 27 is conveyed to the spreader or deflector plate 22, being divided as it leaves the chute by means of the dividing plate 24, as shown in Figs. 1, 2 and 3, or by being directed by the auxiliary chute to the apex of the spreader as shown in Figs. 4, 5 and 6. The fertilizer is therefore spread on opposite sides of the furrow and as a portion of each spreader plate lies within the plow, the fertilizer is thus distributed before the plow leaves the furrow which it has formed. After the plow advances in the furrow, a portion at least of the earth falls back into the same and this is mixed with the fertilizer by means of the mixer plate 25 and its arms 26, this being done in advance of depositing the seeds from the seed chute 20 and on both sides of the center of the furrow so that as the seeds are deposited in the center of the furrow, the fertilizer is placed and mixed with the soil on both sides of the deposited seeds without coming into direct contact therewith. It will be furthermore noted that the spreader is placed at such an elevation as to be immediately above the bottom of the furrow and that the mixer and the diverging arms thereof are so placed as to be on a substantial level with the bottom edges of the plow so as to come immediately at the bottom of the furrow.

I claim as my invention:

1. In a seed planting apparatus a plow, means for depositing fertilizer along the margins of a furrow opened by the plow and at the bottom thereof, and devices for mixing the fertilizer with the earth at the bottom of the furrow on both sides of the center thereof.

2. In a seed planting apparatus, a plow, means for spreading fertilizer in a furrow along the margins thereof, and a device immediately at the rear of the plow and on the same level as the bottom thereof for mixing fertilizer with the earth on both sides of the center of the furrow opened by the plow.

3. In a seed planting apparatus, a plow having upright sides, spreader plates secured to the lower edges of the sides of the plow, means for spreading fertilizer in a furrow along the margins thereof, and a device for mixing fertilizer with the earth at the bottom of the furrow on both sides of the center thereof.

4. In a seed planting apparatus, a plow having upright sides, spreader plates secured to the lower edges of the sides of the plow, means within the plow and adjacent the bottom thereof for spreading fertilizer along the margins of a furrow opened by the plow, and a device immediately at the rear of the plow for mixing the fertilizer with the earth at the bottom of the furrow on both sides of the center thereof.

5. In a seed planting apparatus, a frame, a plow secured therein, means in the plow and adjacent the bottom thereof for spreading fertilizer along the margins of the furrow opened by the plow, a fertilizer hopper, means for feeding the fertilizer from the hopper and conveying the same to the aforesaid means for spreading the fertilizer, and a device for mixing the fertilizer with the earth at the bottom of the furrow on both sides at the center thereof.

6. In a seed planting apparatus, a frame, a plow secured therein, means within the plow and adjacent the bottom thereof for spreading fertilizer along the margins of the furrow opened by the plow, a hopper, a chute, devices for feeding the fertilizer from the hopper to the chute to convey the same to the means for spreading the fertilizer, and devices immediately at the rear of the plow for mixing the fertilizer with the earth at the bottom of the furrow on both sides of the center thereof.

7. In a seed planting apparatus, a frame, a plow secured in the said frame, a spreader plate secured to the lower edges of the sides of the plow, means within the plow for spreading fertilizer along the margins of the furrow opened by the plow, a fertilizer hopper and devices for feeding the fertilizer therefrom on the said frame, a chute for conveying the fertilizer from the hopper and its feeding device to the said means for spreading fertilizer, and a device for mixing the fertilizer with the earth at the bottom of the furrow on both sides of the center thereof.

8. In a seed planting apparatus, a frame, a plow fixed in said frame, a seed chute secured in the said frame, a shoe connected to and extending between the said plow and said chute, a device secured to the said shoe for spreading fertilizer on the bottom of a furrow opened by the plow, and a device also secured to the said shoe for mixing the fertilizer with the earth at the bottom of the furrow on both sides of the center thereof.

9. In a seed planting apparatus, a frame, a plow secured therein, a seed chute also secured in said frame, a shoe extending between and connected to the said plow and said chute, an inverted V-shaped fertilizer spreader secured to the said shoe and lying partially within the said plow adjacent the bottom thereof, and a device for mixing the fertilizer with the earth at the bottom of the furrow on both sides of the center thereof.

10. In a seed planting apparatus, a frame, a plow secured therein, a seed chute also secured in the said frame, a shoe extending between and connected to the said plow and seed chute, a device secured to the said shoe adjacent the bottom of the plow for spreading fertilizer along the margins of a furrow opened by the plow, and a mixer secured to the said shoe at the rear of the plow and substantially on the level of the bottom thereof for mixing the fertilizer with the earth at the bottom of the furrow on both sides of the center thereof.

11. In a seed planting apparatus, a frame, a plow secured in said frame, a seed chute also secured in the frame, a shoe extending between and connected to the said plow and seed chute, an inverted V-shaped fertilizer spreader connected to the said shoe and lying partially within the plow adjacent the bottom thereof, a hopper secured on the said frame, a device for receiving fertilizer from the said hopper and directing the same to the apex of the V-shaped fertilizer spreader, and a fertilizer mixer secured to said shoe at the rear of the plow for mixing fertilizer with the earth at the bottom of the furrow on both sides of the center thereof.

12. In a seed planting apparatus, a frame, a plow secured in said frame, a seed chute also secured in the frame, a shoe extending between and connected to the said plow and seed chute, an inverted V-shaped fertilizer spreader connected to the said shoe and lying partially within the plow adjacent the bottom thereof, a hopper secured on the said frame, a device for receiving fertilizer from the said hopper and directing the same to the apex of the V-shaped fertilizer spreader, a fertilizer mixer secured to said shoe at the rear of the plow for mixing fertilizer with the earth at the bottom of the furrow on both sides of the center thereof, and means for feeding fertilizer from the said hopper to the device for directing the fertilizer to the apex of the fertilizer spreader.

Signed by me this 21st day of February, 1917.

LEWIS AUGUSTUS ASPINWALL.

Copies of this patent may be obtained for five cents each, by addressing the "Commissioner of Patents, Washington, D. C."